United States Patent [19]

Jensen

[11] 4,040,306
[45] Aug. 9, 1977

[54] FORWARD AND REVERSE MECHANISM HAVING A SINGLE DIRECTION

[75] Inventor: Louis Theodore Jensen, Terre Haute, Ind.

[73] Assignee: J. I. Case Company, Racine, Wis.

[21] Appl. No.: 676,123

[22] Filed: Apr. 12, 1976

[51] Int. Cl.² ...................... B60K 20/04; G05G 11/00
[52] U.S. Cl. ........................................ 74/334; 74/560;
74/474; 74/481
[58] Field of Search .............. 74/560, 474, 481, 334, 74/754

[56] References Cited

U.S. PATENT DOCUMENTS

| 902,856 | 11/1908 | Cave | 74/481 X |
|---|---|---|---|
| 1,209,147 | 12/1916 | Griscom | 74/334 |
| 1,239,436 | 9/1917 | Walrath | 74/334 |
| 1,258,521 | 3/1918 | Backus | 74/334 |
| 1,309,680 | 7/1919 | Boyd | 74/334 |
| 1,377,498 | 5/1921 | Mottier | 74/334 |
| 1,409,396 | 3/1922 | Mottier | 74/334 |
| 1,583,989 | 5/1926 | Mottier | 74/334 |
| 1,734,441 | 11/1929 | Mottier | 74/334 |
| 1,749,837 | 3/1930 | Nickell | 74/334 |
| 2,057,810 | 10/1936 | Alspaugh | 74/334 |

*Primary Examiner*—Samuel Scott
*Assistant Examiner*—Don E. Ferrell
*Attorney, Agent, or Firm*—Arthur J. Hansmann

[57] ABSTRACT

A forward and reverse mechanism having a single direction foot pedal and having a control member extending to a device to be controlled by the movement of the foot pedal. Forward and neutral and reverse mode mechanism interconnects the foot pedal and the control member, and a shift member sets the mechanism in the desired one of the three modes. With the mechanism set in any one of the three modes, simply depressing the foot pedal will create the forward or the reverse or will establish the neutral condition for the entire assembly.

3 Claims, 2 Drawing Figures

FORWARD AND REVERSE MECHANISM HAVING A SINGLE DIRECTION

This invention relates to a forward and reverse mechanism having a single direction foot pedal, and, more particularly, it pertains to foot pedal control mechanism for use with vehicles and on the hydrostatic or like drive devices for the vehicles.

BACKGROUND OF THE INVENTION

The prior art commonly employs two foot pedals which are individually connected to devices controlled by the foot pedals, such as one foot pedal being available for a forward mode and the other foot pedal being available for a reverse mode. Also, the prior art is aware of forward and reverse mechanisms which employ only a single foot pedal, and wherein that single foot pedal is suitably connected to mechanisms such that the foot pedal can be depressed by the operator's toe for a forward mode of operation and which can be depressed by the operator's heel for a reverse mode of operation. In that instance, the single foot pedal pivots in two directions for operating the device connected thereto, with the one direction being a first or forward mode of operation and with other direction of pivot for the foot pedal being a reverse mode of operation for the device connected with the foot pedal. Still further, the prior art is aware of arrangements wherein a foot pedal is connected to a device, such as a hydrostatic drive mechanism and including a shiftable member or lever on a hydraulic propulsion drive pump for establishing for forward and reverse modes of drive.

The present invention provides a forward and reverse mechanism having a single direction foot pedal which requires that the operator only depress the pedal for either the forward or reverse mode, and a shift lever is arranged with the mechanism so that the operator needs to only manipulate a hand type of shift lever and the foot pedal which is depressed in only one direction for all modes of operation. As such, the present invention simplifies the mechanism heretofore known, and it provides a type of mechanism which the operator is more familiar with and which therefore requires only more familiar or common maneuvering for establishing the different modes of operation achievable with the mechanism of this invention.

Accordingly, the present invention is an improvement upon the foot control type of mechanisms heretofore known and utilized for the purpose of forward and reverse drives or the like, such as those employed in hydrostatic drive systems for tractors and other vehicles. Still further, the present invention provides a forward and reverse mechanism which the operator can easily and positively set in the desired mode of operation, and in which the operator can easily see which mode the mechanism is set in, prior to actually operating the mechanism for forward or reverse movement of the tractor or like vehicle. Accordingly, the present invention provides a forward and reverse type of mechanism which only requires that the operator perform customary and trained and habitual types of maneuvers, such as placing a shift lever in a forward or reverse mode and such as depressing a single pedal in one direction for movement of the tractor or vehicle in either direction.

Other objects and advantages will become apparent upon reading the following description in light of the accompanying drawings.

DETAILED DESCRIPTION OF THE PREFERRED EMBODIMENT

Figure 1:
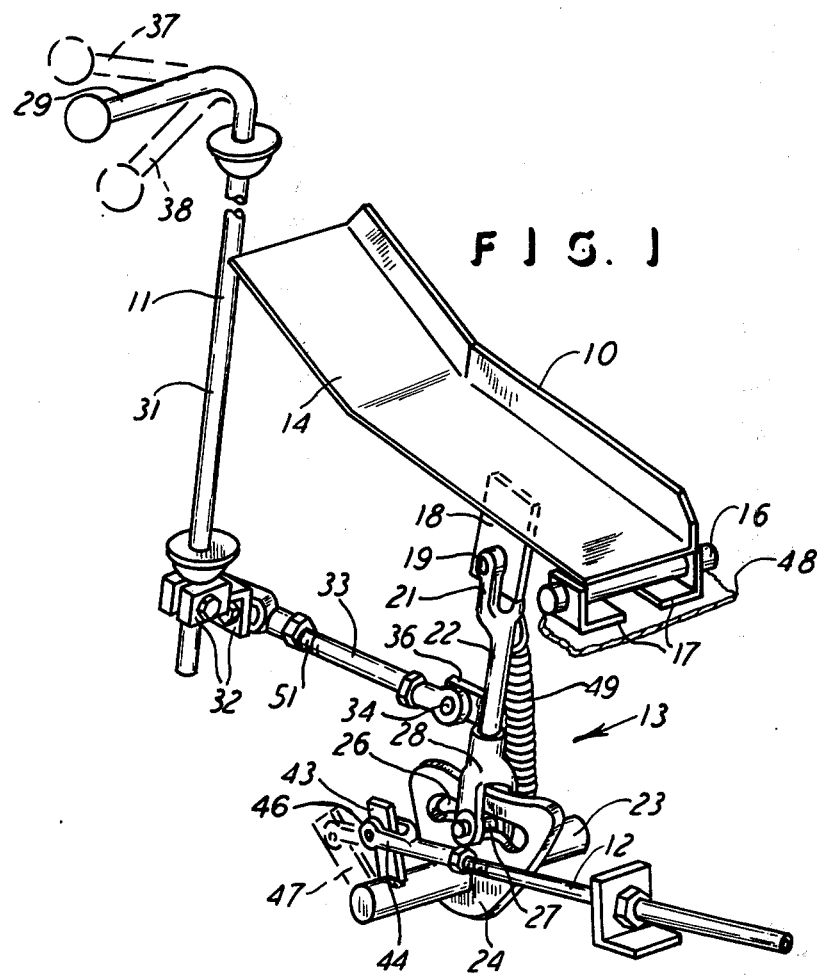
FIG. 1 is a rear perspective view of a preferred embodiment of this invention.

The drawings show a single direction foot pedal 10 and a shift lever or member 11 and a control member 12 in the form of a cable or rod and being of a conventional type of member which extends to a hydrostatic device or other device (not shown) which is of course set in an operative position through the movement of the member 12 along the longitundinal axis or length of the member 12, all in a conventional arrangement of the member 12 and the unshown device connected therewith. Also, the drawings show forward and reverse mode mechanism generally designated 13 and interconnected between the foot pedal 10 and the member 12 for transmitting the pivotal motion of the pedal 10 to the member 12 for either the forward or the reverse mode of movement of the control member 12.

Accordingly, the pedal 10 is shown to have a foot rest type of plate 14 suitably attached to a pin or shaft 16 rotatably mounted on supports 17. Thus the pedal plate 14 can be depressed by means of the operator's foot, and the plate 14 is operated by a downward pivoting about the mounting shaft 16 to which the plate 14 is suitably connected, such as by welding underneath, or the like. A plate 18 is also suitably connected underneath the foot pedal plate 14 and extends therebelow and is connected to the forward and reverse mode mechanism 13, such as by means of a pin 19 extending through a yoke 21 in the top of a link 22 extending below the foot pedal 10, as shown.

The mechanism 13 also includes a suitably rotatably mounted shaft 23 which carries a plate 24 affixed thereto and rotatable with the shaft 23, and the plate 24 has a slot 26 which receives a pin 27 connected to a yoke 28 which is the lower end of the link 22.

The shift lever or member 11 includes the handle portion 29 and it includes the upright portion 31 which is connected, through suitable connectors 32, as shown, to a rod 33 which connects to the members 32 and to the link 22 by means of a pin 34 extending into a plate 36 affixed to the link 22. Accordingly, in any suitable arrangement, the lever 11 is connected to the link 22 such that rotation of the lever portion 31 about its longitudinal axis will induce pivoting of the link 22 about its pin 19, as will be readily seen and understood by one skilled in the art. Also, it will be noticed that the shift lever has its handle portion 29 swingable between the dot-dash positions shown, and the solid-line position shown shows the mechanism 13 in a neutral position, that is neutral relative to the setting of the mechanism 13 and relative to the corresponding setting of the hydrostatic or like device which is connected to the control member 12, as explained above. Therefore, movement of the shift lever handle 29 to the dot-dash position designated 37 will cause the lever portion 31 to rotate in a direction which moves the link 22 rearwardly and thus positions the link pin 27 rearwardly in the plate slot 26, and this could be the reverse mode of positioning, and, as such, the reverse mode is similar to the reverse lever action normally found in tractors and like vehicles. Conversely, movement of the lever 29 to the dot-dash position designated 38 will cause the link 22 to move forwardly and thereby position the link pin 27 in the forward or other end of the slot 26, and thereby create the forward mode of position for the mechanism 13.

Figure 2:
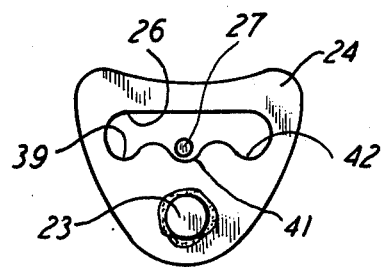
FIG. 2 is a side elevational view of certain of the parts shown in FIG. 1.

Therefore, it will be seen and understood that slot 26 has three positions, such as designated by the detents 39 and 41 and 42 for the forward and neutral and reverse, respectively, positions for the mechanism 13 and therefore for the device connected with the control member 12, as mentioned. FIG. 2 shows the link pin 27 extending through the slot 26 and the pin is aligned with the detent 41 of the three detent shown and described in connection with FIG. 2, which is a centered position. It will also be seen and understood by one skilled in the art that depressing of the pedal 10 will therefore cause the pin 27 to bear downwardly on the plate 24 to thus rotate the plate when the pin 27 is in either detent 39 or 42, which are over-center position, and such rotation correspondingly rotates the shaft 23. A plate 43 is affixed to the shaft 23 to rotate therewith, and the end of the member 12 has a clevis 44 affixed thereto and secured to the plate 43 by means of a pin 46. Accordingly, upon rotation of the plate 24 and the shaft 23, the plate 43 is displaced, such as to the dot-dash line position shown and designated 47, and thus the control member 12 is displaced for controlling the device connected therewith.

Therefore, if the shift lever 11 were placed in the position to have its handle disposed at the location designated 38, the link pin 27 would be in the forward mode position or detent 39, and that would cause the plate 43 to move to the dot-dash position 47, upon downward pressure on the foot pedal 10. Such action and arrangement will produce the desired forward mode of operation, and, as such, the operator has simply maneuvered the lever 11 and the foot pedal 10 in the normal manner of operating such mechanism to produce forward motion of the tractor or vehicle.

Thus, the pedal 10 has its support member 17 resting on a vehicle or tractor floor designated 48.

The forward and reverse mode mechanism also includes a spring 49 which is suitably attached to the upper end of the link 22, such as by any suitable connection to the yoke or clevis 21 or its pin 19, and the lower end of the spring 19 is suitably mounted on the shaft 23. The arrangement is such that one skilled in the art will readily comprehend how the ends of the spring 29 can be connected, as mentioned above, and the entire arrangement is such that the spring 49 will urge the link 22 downwardly to have the pin 27 seated in one of the three detents 39 and 41 and 42, as selected by the operator according to the positioning of the shift lever handle 29. In that manner, the mechanism 13 is snug and secure with respect to its interconnection between the pedal 10 and the control member 12, and there is therefore no lost motion or play in the use of the pedal 10 for actuation of the member 12. Also, the rod 33 is shown provided with screw threads 51 such that the overall length of the rod 33 from its connection with the members 32 and the pin 34 can be altered, and thus the precise positioning of the link pin 27 relative to the three detents can be established and controlled, as desired.

The structure of this invention is therefore shown to include the single direction foot pedal 10 and the member 12 which is movable in the two opposite directions along its length, and it includes the forward and reverse mode mechanism 13 which includes the shaft 23 and the over-center shiftable assembly of the link 22 and the plate 24 being interengageable parts for establishing the forward and reverse and neutral positions described. Of course the structure of the invention also shows the shift member 11 connected with the mechanism 13. Also, the longitudinal axes of the foot pedal hinge pin 16 and the shaft 23 are parallel to each other, and the two directions of movement of the member 12 are transverse to the axes of pin 16 and shaft 23. Of course the shaft 23 is suitably mounted relative to the tractor frame for rotation about the longitudinal axis of the shaft 23.

What is claimed is:

1. A forward and reverse mechanism having a single direction foot pedal, comprising a pivotally-mounted foot pedal arranged to be operative in a single direction of movement, a member movable in two opposite directions in response to pivotal movement of said foot pedal, and forward and reverse mode mechanism operatively interconnected between said foot pedal and said member for transmitting movement of said foot pedal to said member, said mechanism including a rotatably-mounted shaft operatively associated with said member for inducing the movement of said member in the two directions, said mechanism including an over-center shiftable assembly operatively interconnected between said foot pedal and said shaft and consisting of a plate and a link, with said plate being mounted on and rotatable with said shaft, and with said link being connected between said plate and said pedal, said plate having three detents in a row therein and respectively corresponding to forward and reverse and neutral modes of said mechanism and with said neutral mode being the centered position of said over-center shiftable assembly and with the other two of said detents being on opposite sides of said centered position, said link having an end disposed in said detents for selective engagement therewith for forward and reverse positions to effect movement of said member in the selected one of the two directions and in response to the single direction of movement of said pedal, and a shift member operatively associated with said over-center shiftable assembly for positioning same in relative neutral, forward, and reverse positions.

2. The forward and reverse mechanism having a single direction foot pedal as claimed in claim 1, including spring means operatively interconnected between said foot pedal and said assembly for urging said assembly into operative contact at said detents.

3. The forward and reverse mechanism having a single direction foot pedal as claimed in claim 1, wherein said foot pedal pivot axis and the axis of said shaft are disposed parallel to each other to define said centered position, and said two opposite directions of movement of said member being transverse to said axes in accordance with said over-centered positions.

* * * * *